US012227614B2

(12) United States Patent
Lorenz et al.

(10) Patent No.: US 12,227,614 B2
(45) Date of Patent: Feb. 18, 2025

(54) PROCESS FOR PREPARING POLYOXYALKYLENE POLYESTER POLYOLS

(71) Applicant: Covestro Intellectual Property GmbH & Co. KG, Leverkusen (DE)

(72) Inventors: Klaus Lorenz, Dormagen (DE); Frank Kleinig, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 432 days.

(21) Appl. No.: 17/782,749

(22) PCT Filed: Dec. 14, 2020

(86) PCT No.: PCT/EP2020/085883
§ 371 (c)(1),
(2) Date: Jun. 6, 2022

(87) PCT Pub. No.: WO2021/122401
PCT Pub. Date: Jun. 24, 2021

(65) Prior Publication Data
US 2023/0002552 A1 Jan. 5, 2023

(30) Foreign Application Priority Data
Dec. 17, 2019 (EP) .................... 19216930

(51) Int. Cl.
*C08G 63/672* (2006.01)
*C08G 18/08* (2006.01)
*C08G 18/10* (2006.01)
*C08G 18/42* (2006.01)
*C08G 63/48* (2006.01)
*C08G 63/82* (2006.01)
*C08G 65/26* (2006.01)
*C08G 101/00* (2006.01)

(52) U.S. Cl.
CPC .......... *C08G 63/672* (2013.01); *C08G 18/10* (2013.01); *C08G 18/14* (2013.01); *C08G 18/4261* (2013.01); *C08G 18/4263* (2013.01); *C08G 63/48* (2013.01); *C08G 63/82* (2013.01); *C08G 65/26* (2013.01); *C08G 2101/00* (2013.01); *C08G 2110/0025* (2021.01); *C08G 2650/36* (2013.01); *C08G 2650/38* (2013.01)

(58) Field of Classification Search
CPC ....... C08G 63/672; C08G 63/48; C08G 63/82
See application file for complete search history.

(56) References Cited

U.S. PATENT DOCUMENTS

| 2,834,748 A | 5/1958 | Bailey et al. |
| 2,917,480 A | 12/1959 | Bailey et al. |
| 2,941,967 A | 6/1960 | Moller et al. |
| 3,019,731 A | 2/1962 | Edwards et al. |
| 3,120,502 A | 2/1964 | Merten |
| 3,124,605 A | 3/1964 | Wagner |
| 3,152,162 A | 10/1964 | Fischer et al. |
| 3,277,138 A | 10/1966 | Holtschmidt et al. |
| 3,330,782 A | 7/1967 | Poppelsdorf |
| 3,394,164 A | 7/1968 | McClellan et al. |
| 3,401,190 A | 9/1968 | Schmitt et al. |
| 3,404,109 A | 10/1968 | Milgrom |
| 3,454,606 A | 7/1969 | Brotherton et al. |
| 3,455,883 A | 7/1969 | Kamal et al. |
| 3,492,301 A | 1/1970 | Herweh et al. |
| 3,517,039 A | 6/1970 | Wagner et al. |
| 3,567,763 A | 3/1971 | Emmons et al. |
| 3,620,984 A | 11/1971 | Dahm et al. |
| 3,629,308 A | 12/1971 | Bailey et al. |
| 3,644,457 A | 2/1972 | Konig et al. |
| 3,645,927 A | 2/1972 | Karlheinz et al. |
| 3,654,106 A | 4/1972 | Wagner et al. |
| 3,694,510 A | 9/1972 | Moller et al. |
| 3,738,947 A | 6/1973 | Fishbein et al. |
| 3,769,318 A | 10/1973 | Windemuth et al. |
| 3,814,707 A | 6/1974 | Moeller et al. |
| 3,823,145 A | 7/1974 | Louvar et al. |
| 3,829,505 A | 8/1974 | Johnston |
| 3,832,311 A | 8/1974 | Windemuth et al. |
| 3,941,849 A | 3/1976 | Johnston |
| 4,088,665 A | 5/1978 | Findeisen et al. |

(Continued)

FOREIGN PATENT DOCUMENTS

| CN | 101250260 A | 8/2008 |
| DE | 1027394 B | 4/1958 |

(Continued)

OTHER PUBLICATIONS

Ionescu, M., Advances in Urethanes Science and Technology, 1998, vol. 14, pp. 151-218.
Kunststoff-Handbuch, Munich, Carl Hanser Verlag, 1966, vol. VII, pp. 108 ff, 453ff, 507-510.
Randall, D., et al., The Polyurethanes Book, New York, John Wiley & Sons Ltd., 2002, pp. 127-136, 232-233, 261.
Siefken, W., Justus Liebigs Annalen der Chemie, vol. 562, pp. 75-136.
Ullmann's Encyclopedia of Industrial Chemistry, 1992, vol. B4, p. 167ff.

(Continued)

*Primary Examiner* — Michael L Leonard
(74) *Attorney, Agent, or Firm* — Donald R. Palladino

(57) ABSTRACT

The present invention relates to a process for preparing polyoxyalkylene polyester polyols by reacting a starter compound having Zerewitinoff-active H atoms, a cyclic dicarboxylic acid anhydride and a fatty acid ester with an alkylene oxide in the presence of a basic catalyst. The invention further relates to polyoxyalkylene polyester polyols resulting from the method and to a preparation method for polyurethanes by reaction of the polyoxyalkylene polyester polyols according to the invention.

19 Claims, No Drawings

(56) References Cited

U.S. PATENT DOCUMENTS

| | | |
|---|---|---|
| 4,096,162 A | 6/1978 | Windemuth et al. |
| 4,143,003 A | 3/1979 | Haas et al. |
| 4,248,930 A | 2/1981 | Haas et al. |
| 4,294,719 A | 10/1981 | Kuno et al. |
| 4,344,855 A | 8/1982 | Schaefer et al. |
| 4,348,536 A | 9/1982 | Blahak et al. |
| 4,507,475 A | 3/1985 | Straehle et al. |
| 4,521,548 A | 6/1985 | Christen et al. |
| 5,066,713 A | 11/1991 | Flakus |
| 5,158,922 A | 10/1992 | Hinney et al. |
| 5,470,813 A | 11/1995 | Le-Khac |
| 5,482,908 A | 1/1996 | Le-Khac |
| 5,545,601 A | 8/1996 | Le-Khac |
| 5,585,413 A | 12/1996 | Nagashima |
| 5,627,120 A | 5/1997 | Le-Khac |
| 5,712,216 A | 1/1998 | Le-Khac et al. |
| 5,714,428 A | 2/1998 | Le-Khac |
| 5,786,405 A | 7/1998 | Schilling et al. |
| 5,973,096 A | 10/1999 | Watabe et al. |
| 6,197,839 B1 | 3/2001 | Genz et al. |
| 6,376,625 B1 | 4/2002 | Cosman et al. |
| 7,008,900 B1 | 3/2006 | Hofmann et al. |
| 2003/0150814 A1 | 8/2003 | Bader et al. |
| 2004/0014829 A1 | 1/2004 | Neff et al. |
| 2004/0167316 A1 | 8/2004 | Anderson et al. |
| 2005/0045858 A1* | 3/2005 | Feske .................. C08K 5/11 252/609 |
| 2005/0222380 A1 | 10/2005 | Peters et al. |
| 2008/0114086 A1* | 5/2008 | Lorenz .................. C08G 18/14 521/88 |
| 2009/0048420 A1 | 2/2009 | Klaus et al. |
| 2010/0099788 A1 | 4/2010 | Klaus et al. |
| 2011/0021738 A1 | 1/2011 | Klaus |
| 2011/0269863 A1* | 11/2011 | Kunst .................. C08G 18/10 568/679 |

FOREIGN PATENT DOCUMENTS

| | | |
|---|---|---|
| DE | 2618280 A1 | 11/1977 |
| DE | 2636787 A1 | 2/1978 |
| DE | 19628145 A1 | 1/1998 |
| GB | 843841 A | 8/1960 |
| GB | 848671 A | 9/1960 |
| GB | 874430 A | 8/1961 |
| GB | 889050 A | 2/1962 |
| GB | 965474 A | 7/1964 |
| GB | 994890 A | 6/1965 |
| GB | 1072956 A | 6/1967 |
| GB | 1086404 A | 10/1967 |
| GB | 1091949 A | 11/1967 |
| GB | 1267011 A | 3/1972 |
| GB | 1303201 A | 1/1973 |
| GB | 1530225 A | 10/1978 |
| JP | H06157743 A | 6/1994 |
| RO | 118433 B1 | 5/2003 |
| WO | 9620972 A2 | 7/1996 |
| WO | 2013110512 A1 | 8/2013 |

OTHER PUBLICATIONS

Handbuch Apparate; Vulkan-Verlag Essen, 1st ed. (1990), pp. 188-208.

G. Oertel (ed.): "Kunststoff-Handbuch", vol. VII, Carl-Hanser-Verlag, Munich, Vienna 1993, pp. 113-115.

International Search Report, PCT/EP2020/085883, date of mailing: Jan. 25, 2021, Authorized officer: Michael Hoffmann.

* cited by examiner

PROCESS FOR PREPARING POLYOXYALKYLENE POLYESTER POLYOLS

CROSS-REFERENCE TO RELATED APPLICATION

This application is a national stage application under 35 U.S.C. § 371 of PCT/EP2020/085883, filed Dec. 14, 2020, which claims the benefit of European Application No. 19216930.8, filed Dec. 17, 2019, which is incorporated herein by reference.

FIELD

The present invention relates to a process for preparing polyoxyalkylene polyester polyols by reaction of a starter compound having Zerewitnoff-active H atoms, a cyclic dicarboxylic anhydride and a fatty acid ester with an alkylene oxide in the presence of a basic catalyst. The invention further also relates to the polyoxyalkylene polyester polyols resulting from the process and to a process for preparing polyurethanes by reaction of the polyoxyalkylene polyester polyols according to the invention.

BACKGROUND

Polyols based on renewable raw materials such as fatty acid triglycerides, sugar, sorbitol, glycerol and dimer fatty alcohols are already used in a variety of ways as raw materials in the manufacture of polyurethane materials. The use of such components will continue to increase in future, since products from renewable sources will be favorably assessed in life cycle assessments and the availability of raw materials based on petrochemicals will decrease in the long term. In addition, the targeted use of triglycerides in the preparation of alkylene oxide addition products based on starters having Zerewitinoff-active hydrogen atoms makes it possible to prepare polyether ester polyols characterized by an increased dissolving power for blowing agents based on (partially halogenated) hydrocarbons and typically used in rigid foam formulations.

EP 1923417 A1 discloses a single-stage process for preparing polyether ester polyols by reaction of starter compounds having Zerewitinoff-active hydrogen atoms ("H-functional starter compounds") with alkylene oxides under base catalysis in the presence of fatty acid esters as a renewable raw material, wherein the fatty acid residues of the fatty acid esters contain no free OH groups. These polyether ester polyols are used as components in formulations with other polyols in the preparation of rigid PUR/PIR foams, wherein these PUR/PIR systems are characterized by good demolding characteristics.

EP 2807199 A1 discloses a process for preparing a polyoxyalkylene polyether ester polyol by reacting a Zerewitinoff-active starter compound with fatty acid esters and alkylene oxides using basic imidazole catalysts, wherein preparation is additionally carried out in the presence of a cyclic anhydride of dicarboxylic acids. The resulting polyetherester polyols are likewise used in the preparation of rigid foams. It is thought that the presence of the aromatic dicarboxylic acid units in the polyoxyalkylene polyester polyol end product should lead to improved flame retardant properties.

However, EP 2807199 A1 failed to provide a process affording end products that are as light-colored as possible. However, when using aminic catalysts for the alkylene oxide addition, in particular those based on aromatic amines such as for example imidazole and its derivatives or N,N-dimethylaminopyridine, which are a) characterized by a high activity and which b) distinguish themselves from the use of, for example, KOH as alkylene oxide addition catalyst in that they can remain in the end product, it is observed that very strongly discolored products are formed. Products with little discoloration are advantageous in applications intended to meet both technical and optical requirements. This applies to coatings for example.

SUMMARY

Starting from the prior art the present invention has for its object to provide an improved process for preparing single-phase polyoxyalkylene polyester polyols, in particular those having number-average functionalities of not less than 2, that leads to polyol products that are less discolored. The polyoxyalkylene polyester polyol products shall moreover be obtainable by a process which is simple to perform and as energy efficient as possible, in particular the mixing power input to be supplied during preparation of the polyether ester polyols shall be in a range which is technically readily achievable.

The object was surprisingly achieved by a process for preparing polyoxyalkylene polyester polyols by reaction of a starter compound (1) having Zerewitnoff-active H atoms, a cyclic dicarboxylic anhydride (2) and a fatty acid ester (3) with an alkylene oxide (4) in the presence of a basic catalyst (5) comprising the steps of:

(i) providing a mixture (i) comprising the starter compound (1) and the fatty acid ester (3), wherein the mixture (i) contains no cyclic dicarboxylic anhydride (2);

(ii) reacting the mixture (i) from step (i) with a portion (v1) of the alkylene oxide (4), wherein at least 0.15 mol of alkylene oxide (4) per 1 mol of Zerewitinoff-active hydrogen atoms of the starter compound (1) is added to form a compound (ii);

(iii) reacting the compound (ii) formed in step (ii) by addition of the dicarboxylic anhydride (2) to form a compound (iii);

(iv) reacting the compound (iii) from step (iii) with a portion (v2) of the alkylene oxide (4), wherein at least 1.15 mol of alkylene oxide (4) per 1 mol of the dicarboxylic anhydride (2) is added.

DETAILED DESCRIPTION

In the context of the present invention polyoxyalkylene polyester polyols are to be understood as meaning products of the reaction of starter compounds (1) with Zerewitnoff-active H atoms, cyclic dicarboxylic anhydrides (2), fatty acid esters (3) and alkylene oxides (4), wherein the reaction of the fatty acid esters and the cyclic dicarboxylic anhydrides affords ester units and the ring-opening products of the alkylene oxides can also lead to ether bonds. In such a process the Zerewitnoff-active H atoms form hydroxyl end groups and, intermediately, also carboxyl functions.

In the context of the present invention starter compounds (1) having Zerewitnoff-active H atoms (H-functional starter compounds) are to be understood as meaning compounds comprising at least one Zerewitinoff-active hydrogen atom. Hydrogen bonded to N, O or S is referred to as Zerewitinoff-active hydrogen (or as "active hydrogen") if it affords methane by reaction with methylmagnesium iodide by a method discovered by Zerewitinoff. Typical examples of compounds having Zerewitinoff-active hydrogen are compounds containing carboxyl, hydroxyl, amino, imino or thiol groups as functional groups.

Suitable H-functional starter compounds ("starters") preferably have functionalities of 2 to 8, but in particular cases also functionalities up to 35. The molar masses thereof are from 17 g/mol to 1200 g/mol Amino-functional starter compounds may also be used as well as hydroxy-functional starter compounds. Preferred starters have functionalities of not less than 2 to not more than 4. Examples of hydroxy-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea, and Mannich bases. It is also possible to use high-functionality starter compounds based on hydrogenated starch hydrolysis products. These are described, for example, in EP-A 1 525 244. Examples of starter compounds containing amino groups are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane.

The starter compounds (1) are used either individually or as a mixture of at least two starter compounds.

The process may moreover additionally employ preprepared alkylene oxide addition products of the low molecular weight starter compounds mentioned, i.e. polyether polyols having OH numbers of 100 to 1000 mg KOH/g, as starters. The preparation of such a preprepared alkylene oxide addition product may, for example, also be carried out in situ before the addition of the fatty acid ester in step (i) by metered addition of a sufficient amount of alkylene oxide to the starter compound (1). European patent application EP 2177555 A2 teaches that such an approach is advantageous especially when starter compounds having melting points higher than room temperature are used in polyether ester production processes, since this significantly improves the conversion of such solid starting compounds. The process according to the invention may also employ polyester polyols having OH numbers in the range from 6 to 800 mg KOH/g in addition to the starter compounds. Polyester polyols suitable therefor may be prepared for example from organic dicarboxylic acids having 2 to 12 carbon atoms and polyhydric alcohols, preferably diols, having 2 to 12 carbon atoms, preferably 2 to 6 carbon atoms.

In one embodiment of the process according to the invention, the starter compound is one or more compounds and is selected from the list consisting of propylene glycol, ethylene glycol, diethylene glycol, dipropylene glycol, trimethylolpropane, glycerol, triethanolamine, pentaerythritol, sorbitol, sucrose, ethylenediamine, hexamethylenediamine, aniline, the isomers of toluidine, the isomers of diaminotoluene, in particular those having amino groups positioned ortho to one another, the isomers of diaminodiphenylmethane and the higher polycylic products obtained in the condensation of aniline with formaldehyde to afford diaminodiphenylmethane.

Carboxylic anhydrides suitable for the process according to the invention are, in particular, cyclic dicarboxylic anhydrides selected from the group comprising phthalic anhydride, 1,8-naphthalenedicarboxylic anhydride, 1,2,4-benzenetricarboxylic anhydride, maleic anhydride, succinic anhydride, tetrahydrophthalic anhydride and alkenylsuccinic anhydrides and mixtures thereof. In one embodiment, the cyclic anhydride of a dicarboxylic acid may also be itaconic anhydride.

The alkenylsuccinic anhydrides may be selected from the group of C12-C20 alkyl chain-substituted succinic anhydrides and poly(isobutylene)succinic anhydrides having molar masses between 500 and 2000 g/mol.

In one embodiment of the process according to the invention, the cyclic dicarboxylic anhydride (2) is an aromatic cyclic dicarboxylic anhydride, for example phthalic anhydride, 1,8-naphthalenedicarboxylic anhydride and 1,2, 4-benzenetricarboxylic anhydride. Phthalic anhydride is particularly preferred.

The cyclic dicarboxylic anhydrides (2) are employed either individually or as a mixture of at least two dicarboxylic anhydrides.

The umbrella term "fatty acid esters" refers hereinafter to fatty acid glycerides, especially fatty acid triglycerides, and/or fatty acid esters based on other mono- and polyfunctional alcohols. The fatty acid residues of the fatty acid esters may, as is the case in castor oil, themselves bear hydroxyl groups. It goes without saying that it is also possible to use fatty acid esters whose fatty acid residues have subsequently been modified with hydroxyl groups in the process according to the invention. Fatty acid residues that have been modified in this way may be obtained, for example, by epoxidation of the olefinic double bonds and subsequent ring opening of the oxirane rings using nucleophiles or by hydroformylation/hydrogenation. It is also possible to treat unsaturated oils with atmospheric oxygen for this purpose, frequently at elevated temperature.

All triglycerides are suitable as substrates for the processes according to the invention. Examples include cottonseed oil, peanut oil, coconut oil, linseed oil, palm kernel oil, olive oil, corn oil, palm oil, castor oil, lesquerella oil, rapeseed oil, soybean oil, sunflower oil, herring oil, sardine oil and tallow. It goes without saying that it is also possible to employ fatty acid esters of other mono- or polyhydric alcohols as well as fatty acid glycerides having less than 3 fatty acid residues per glycerol molecule in the process according to the invention. The fatty acid (tri)glycerides and the fatty acid esters of other mono- and polyhydric alcohols may also be used in the mixture.

In one embodiment of the process according to the invention, the fatty acid ester (3) has no free hydroxyl groups in the fatty acid residues.

In one embodiment of the process according to the invention, the fatty acid ester (3) without free hydroxyl groups in the fatty acid residues is one or more compounds and is selected from the group consisting of cottonseed oil, peanut oil, coconut oil, linseed oil, palm kernel oil, olive oil, corn oil, palm oil, jatropha oil, rapeseed oil, soybean oil, sunflower oil, herring oil, sardine oil and tallow, preferably soybean oil.

In the preparation of the polyoxyalkylene polyester polyols according to the invention the fatty acid ester (3) is employed in amounts of 10% by weight to 70% by weight, preferably 10% by weight to 40% by weight and particularly preferably 10% by weight to 30% by weight, based on the sum of all components.

The fatty acid esters (3) are used either individually or as a mixture of at least two starter compounds.

Suitable alkylene oxides are, for example, ethylene oxide, propylene oxide, 1,2-butylene oxide or 2,3-butylene oxide and styrene oxide. It is preferable to supply propylene oxide and ethylene oxide to the reaction mixture individually, as mixture or successively. If the alkylene oxides are metered in successively, the products prepared contain polyether chains having block structures. For example, step (iv) may comprise metered addition of an alkylene oxide other than that added in step (ii). Products having ethylene oxide end blocks are generally characterized by elevated concentrations of primary end groups, which impart the systems with the isocyanate reactivity necessary for molded foam applications. Preferably employed alkylene oxides are propylene oxide and/or ethylene oxide and it is particularly preferable to employ ethylene oxide since the latter provides polyurethane materials prepared on the basis of such polyether esters with elevated flame retardancy.

In one embodiment of the process according to the invention the sum of the portion (v1) of the alkylene oxide (4) added in step (ii) and the portion (v2) of the alkylene oxide (4) added in step (iv) is 90 mol %, preferably 95 mol % and particularly preferably 100% of the total amount (vT) of the alkylene oxide (4) added.

The alkylene oxides (4) are employed either individually or as a mixture of at least two alkylene oxides.

In one embodiment of the process according to the invention, the basic catalyst (5) is added in step (i) and/or in step (iii) and/or in step (iv), preferably in step (i).

In one embodiment of the process according to the invention, the basic catalyst used is an alkali metal or alkaline earth metal hydroxide, preferably potassium hydroxide. The catalyst may be added to the reaction mixture in the form of aqueous solutions or in anhydrous form. Any water of solution present or water formed by the deprotonation of the OH groups is preferably removed before the fatty acid esters are added to the reaction mixture. The dehydration may be carried out, for example, by heat-treating under reduced pressure at temperatures of 80° C. to 150° C. and optionally assisted by stripping with inert gas. Residual traces of water may finally be removed from the reaction mixture by reaction with small amounts of alkylene oxide before addition of the fatty acid esters. 5% by weight of alkylene oxide based on the total amount of reaction mixture present in the reactor is generally sufficient therefor. The catalyst concentration here is 0.02% to 1% by weight, based on the amount of end product, preferably 0.05% to 0.6% by weight.

In an alternative embodiment of the process according to the invention, the basic catalysts used are alkylene oxide addition products of hydroxy-functional starter compounds having alkoxylate contents of 0.05 to 50 equivalent % ("polymeric alkoxylates"). The alkoxylate content is to be understood as meaning the proportion of Zerewitinoff-active hydrogen atoms removed by a base by deprotonation based on all Zerewitinoff-active hydrogen atoms in the catalyst. The polymeric alkoxylate employed as catalyst may be prepared in a separate reaction step by alkali-catalyzed addition of alkylene oxides to the abovementioned starter compounds having Zerewitinoff-active hydrogen atoms. The preparation of the polymeric alkoxylate typically comprises employing as catalyst an alkali metal or alkaline earth metal hydroxide, for example KOH, in amounts of 0.1% to 1% by weight based on the amount to be prepared, dewatering the reaction mixture under vacuum, performing the alkylene oxide addition reaction under an inert gas atmosphere at 100° C. to 150° C. until achievement of an OH number of 150 to 1200 mg KOH/g and subsequently establishing the abovementioned alkoxylate contents of 0.05 to 50 equivalent % by addition of further alkali metal or alkaline earth metal hydroxides and subsequent dewatering. Polymeric alkoxylates prepared in this way may be stored separately in an inert gas atmosphere. They have long been used in the preparation of long-chain polyether polyols. The amount of the polymeric alkoxylate employed in the process according to the invention is typically such that it corresponds to an amount of alkali metal or alkaline earth metal hydroxide of 200 ppm to 1% by weight based on the end product according to the invention. It goes without saying that the polymeric alkoxylates may also be used as mixtures.

The preparation of the polymeric alkoxylate may also be performed in situ immediately before actual performance of the process according to the invention in the same reactor. The amount of polymeric alkoxylate necessary for a polymerization batch is prepared in the reactor according to the procedure outlined in the previous paragraph. It goes without saying that it is necessary in this procedure to ensure that the extremely small starter quantities at commencement of the reaction are also stirrable. This may optionally be achieved using inert solvents such as toluene and/or THF.

In a further, preferred embodiment of the process according to the invention the basic catalysts employed are amines, such as aliphatic or aromatic amines or alkanolamines. It is preferable to use aromatic amines.

Amines that may be employed as catalysts include for example aliphatic amines or alkanolamines such as N,N-dimethylbenzylamine, dimethylaminoethanol, dimethylaminopropanol, N-methyldiethanolamine, trimethylamine, N,N-dimethylcyclohexylamine, N-methylpyrrolidine, N,N,N',N'-tetramethylethylenediamine, diazabicyclo[2.2.2]octane, 1,4-dimethylpiperazine or N-methylmorpholine.

In a preferred variant of this embodiment of the process according to the invention, the aromatic amine is one or more compounds and is selected from the group consisting of imidazole, 1-methylimidazole, 2-methylimidazole, 4(5)-methylimidazole, 2,4(5)-dimethylimidazole, 1-ethylimidazole, 2-ethylimidazole, 1-phenylimidazole, 2-phenylimidazole, 4(5)-phenylimidazole, and N,N-dimethylaminopyridine. A comprehensive overview of amines that may be used has been given by M. Ionescu et al. in "Advances in Urethanes Science and Technology", 1998, 14, 151-218. Tertiary aliphatic amines or alkanolamines are preferably used as well as imidazole and the imidazole or pyridine derivatives mentioned. The catalysts may be used in concentrations, based on the amount of end product, of 200 ppm to 10 000 ppm, wherein the concentration range from 200 ppm to 5000 ppm is preferred.

In a further, less preferred embodiment of the process according to the invention, the basic catalysts employed are carboxylic acid salts of alkali metals or alkaline earth metals. The underlying carboxylic acids may be monobasic or polybasic. Examples include salts of acetic, propionic and adipic acid. Such alkali metal or alkaline earth metal carboxylates are typically employed in amounts of 0.04% to 2% by weight, based on the amount of end product.

Steps (i), (ii), (iii) and (iv) of the process according to the invention are performed specifically as described below:

Step (i) of the process according to the invention comprises providing a mixture (i) comprising the starter compound (1) and the fatty acid ester (3), wherein the mixture (i) contains no cyclic dicarboxylic anhydride (2).

The mixture (i) is prepared by stirring or pumped circulation via a dispersing unit. Mixture (i) is normally heterogeneous, since the starter compound (1) and the fatty acid ester (3), especially when this is a fatty acid triglyceride whose fatty acid residues bear no free OH groups or when preprepared alkylene oxide addition products of low molecular weight starter compounds are used, are often incompatible with one another. Stirring/recirculation may be effected at elevated temperature, for example at 50° C. to 150° C., to facilitate mixing/dispersion of the components. It is generally unnecessary to adhere to a particular minimum stirring or minimum pumped circulation time.

The mixture (i) comprising the starter compound (1), the fatty acid ester (3) and optionally the catalyst (5) is initially charged in the reactor and reacted with the portion (v1) of the alkylene oxide (4) at temperatures of 80-170° C., preferably 100-150° C. (80-150° C. when using amine catalysts) in an inert gas atmosphere. This alkylene oxide portion (v1) is at least 0.15 mol of alkylene oxide (4) per 1 mol of Zerewitinoff-active hydrogen atoms in the starter compound (1). In order to rule out the presence of water with certainty, addition of the fatty acid ester (3) may be preceded by dewatering under vacuum at temperatures of 80-150° C. (40-130° C. when using amine catalysts), optionally by additional stripping with inert gas. If amines are used as catalysts these may also be added only after such a dewatering step. The alkylene oxide (4) is continuously supplied to the reactor in conventional fashion in such a way that the safety-related pressure limits of the employed reactor system are not exceeded. Such reactions are typically carried out in the pressure range from 10 mbar to 10 bar. Especially in the case of metered addition of ethylene oxide-containing alkylene oxide mixtures or pure ethylene oxide, it should be ensured that a sufficient partial inert gas pressure is maintained within the reactor during the startup and metering phase. This can be established, for example, by means of noble gases or nitrogen. The alkylene oxides (4) may be supplied to the reactor in different ways: One option is metered addition into the gas phase or directly into the liquid phase, for example via an immersed tube or a distributor ring close to the reactor base in a zone with good mixing. In the case of metered addition into the liquid phase, the metered addition units should be designed so as to be self-emptying, for example by situating the metered addition holes on the underside of the distributor ring. Backflow of reaction medium into the alkylene oxide-conducting conduits and metered addition units or into the alkylene oxide reservoir vessels can be advantageously prevented by apparatus measures, for example through installation of non-return valves. The reaction of the alkylene oxide portion (v1) with the mixture (i) is preferably carried out at a temperature of 70° C. to 170° C., particularly preferably at a temperature of 100° C. to 150° C. The temperature may be varied within the described limits during the alkylene oxide metered addition phase. To achieve an optimal balance between high alkylene oxide conversion and low by-product formation when using sensitive starter compounds (for example sucrose), alkoxylation may initially be performed at low reaction temperatures (for example at 70 to 110° C.), a transition to higher reaction temperatures (for example to 110° C. to 130° C.) being made only upon sufficient starter conversion (i.e. once at least 50% by weight of the starter compounds (1) employed have reacted with alkylene oxide at at least one Zerewitinoff-active hydrogen atom). The end of the metered addition phase for the alkylene oxide portion (v1) is typically followed by a postreaction phase in which the remaining alkylene oxide reacts. Post-reactions may optionally be performed at higher temperatures (i.e. after raising the temperature to 100° C. to 170° C., preferably 100° C. to 150° C.). The end of such a post-reaction phase is reached when no further pressure drop or only a very slow remaining pressure drop is detectable in the reaction vessel.

The temperature of the exothermic alkylene oxide addition reaction is kept at the desired level by cooling. According to the prior art relating to the design of polymerization reactors for exothermic reactions (for example Ullmann's Encyclopedia of Industrial Chemistry, volume B4, page 167ff., 5th edition, 1992), such cooling is generally effected via the reactor wall (e.g. double jacket, half-coil pipe) and by means of further heat exchange surfaces disposed internally in the reactor and/or externally in the pumped circulation circuit, for example in cooling coils, cooling cartridges, or plate, shell-and-tube or mixer heat exchangers. These should advantageously be configured such that effective cooling is possible even at commencement of the metering phase, i.e. at a low fill level and/or in the presence of possibly heterogeneous reactor contents (for example in the case of solid dispersions or suspensions).

The cyclic dicarboxylic anhydride (2) is then added to the reaction mixture resulting from step (ii). 0.05 to 1 mol of cyclic dicarboxylic anhydride (2) per 1 mol of the Zerewitinoff-active hydrogen atoms introduced via the starter compound (1) are typically used. Such cyclic dicarboxylic anhydrides (2), which are often present in the form of solids, are advantageously supplied to the reaction mixture as a melt. At the customary reaction temperatures of 70° C. to 170° C. the formation of the half-esters of the dicarboxylic acids on which the cyclic dicarboxylic anhydrides (2) are based by reaction of the cyclic dicarboxylic anhydrides with the starter compound (1) occurs very quickly, see also DE 3916340, and a separate hold time until completion of the half-ester formation can therefore generally be eschewed. On the contrary, it is advisable to proceed quickly with step (iv) after metered addition of the cyclic dicarboxylic anhydride (2) in order to inhibit esterification processes that may occur to the greatest possible extent.

Step (iv) of the process according to the invention comprises reacting the compound (iii) obtained from step (iii) with the portion (v2) of the alkylene oxide (4) in an inert gas atmosphere at temperatures of 80-170° C., preferably 100-150° C. (80-150° C. in the presence of the catalyst (5)), preferably in the presence of amine catalysts. The alkylene oxide portion (v2) is at least 1.15 mol per 1 mol of the cyclic dicarboxylic anhydride (2) added in step (iii). The recommended reaction conditions and apparatus parameters correspond to those already described for step (ii). Step (iv) generally also ends with a post-reaction step which may likewise be performed at relatively high temperatures (i.e. after raising the temperature to 100° C. to 170° C., preferably 100° C. to 150° C.). The end of such a post-reaction phase is reached when no further pressure drop or only a very slow remaining pressure drop is detectable in the reaction vessel. If long-chain polyoxyalkylene polyether ester polyols are prepared, for example those having OH numbers below 100 mg KOH/g, and strong bases, for example alkali metal hydroxides, are used therefor as catalysts, it is recommended that the post-reaction phase at elevated temperature or at reaction temperature should last no longer than absolutely necessary. If, for example, a pressure drop rate specified as an endpoint criterion for the post-reaction time is reached or falls short, the temperature should be reduced to values below 100° C., preferably to values below 80° C., to inhibit the formation of undesired secondary components. If the pressure drop rate falls to a value of 20 mbar/h or below, the post-reaction phase can generally be considered to have ended.

In one embodiment of the process according to the invention, the basic catalyst (5) is added in step (i) and/or in step (iii) and/or in step (iv). It is preferably added in step (i).

The crude polyoxyalkylene polyether ester polyol resulting from step (iv) may optionally be subjected to work-up steps to remove any catalyst traces. In the case of alkylene oxide addition reactions catalysed with amines, such aftertreatment steps are generally not required. The optional removal of the catalyst from the crude polyoxyalkylene polyether ester polyol resulting from step (iv) may be carried out in different ways: For example, the basic catalyst, for example KOH, may be neutralized with dilute mineral acids such as sulphuric acid or phosphoric acid. If neutralization is effected using strong diluted mineral acids (pKa of 1st dissociation stage <2.8) the neutralization should be carried out at relatively low temperatures, for example at 20° C. to 80° C., preferably at 20-60° C., and the amount of acid required for neutralization should be supplied to the alkaline alkylene oxide addition product as quickly as possible to ensure that the basic reaction products are hydrolyzed and neutralized at the same time. It is therefore advisable to eschew a separate hydrolysis step before addition of the neutralization acid. Such a procedure ensures that side reactions at the ester bonds of the polyoxyalkylene polyether ester polyols are avoided to the greatest possible extent. The salts formed in the course of neutralization are removed, for example by filtration. The polyether polyol preparation processes described in EP-A 2028211 and WO-A 2009106244 are exceptions. Alternatively, the neutralization may be effected with hydroxycarboxylic acids (for example lactic acid, as described in WO-A 9820061 and US-A 2004167316). Carboxylic acids such as for example formic acid (cf. U.S. Pat. No. 4,521,548) or else adipic acid are likewise suitable for neutralization. In order to achieve a proton concentration in the polyoxyalkylene polyetherester polyol that is sufficiently high for the intended application, (hydroxy)carboxylic acids are often used in an amount that is in marked excess relative to the amount of basic catalyst to be neutralized. The metal carboxylates formed after neutralization with some carboxylic acids (for example hydroxycarboxylic acids or formic acid) are soluble in the polyoxyalkylene polyether ester polyols to give a clear solution and removal of the salts may therefore be dispensed with here. The neutralization may also be carried out for example by addition of cyclic dicarboxylic anhydrides, such as phthalic anhydride, maleic anhydride, tetrahydrophthalic anhydride or succinic anhydride, to obtain salts which are likewise soluble in the polyoxyalkylene polyether ester polyols according to the invention. Also possible is the use of ring-opening products of cyclic carboxylic anhydrides with polyols, i.e. of dicarboxylic acid half-esters, as neutralizing agents. It should finally be noted that the incompletely alkoxylated oxo acids of phosphorus are likewise suitable as neutralization acids. It is likewise possible to remove the catalyst by using acidic cation exchangers as described for example in DE-A 100 24 313. The catalysts may moreover be removed using adsorbents such as for example phyllosilicates (bentonite, attapulgite), diatomaceous earth or else synthetic magnesium silicates (such as AMBOSOL® or BriteSorb®). Such purification processes are described in RO 118433, U.S. Pat. No. 4,507,475, EP-A 0693513 and EP-A 1751213. Phase separation processes in principle represent a further possibility for separating catalyst residues, but the water solubilities of the polyoxyalkylene polyether ester polyols are generally too high for phase separation processes to be carried out effectively. Phase separation processes are described, for example, in WO-A 0114456, JP-A 6-157743, WO-A 9620972 and U.S. Pat. No. 3,823,145.

The polyoxyalkylene polyether ester polyols according to the invention may be admixed with antioxidants (for example based on phenol derivatives and/or based on aromatic amines). If an alkali metal hydroxide is used to catalyze the alkylene oxide addition onto the employed starter compounds it is advisable to add such antioxidants only after neutralization/removal of these catalyst traces since this makes it possible to obtain less strongly discolored polyoxyalkylene polyether ester polyols.

In one embodiment of the process according to the invention, the power input introduced is between 0.8 and 5 W/l, preferably between 0.8 and 3 W/l, based on the liquid volume after termination of step (iv), i.e. after completed metered addition of all reactants.

Good mixing of the reactor contents in all reaction phases should generally be ensured through configuration and use of commercially available stirrer units, wherein suitable stirrer units here especially include stirrers arranged over one or more levels or stirrer types which act over the full fill height (see, for example, Handbuch Apparate; Vulkan-Verlag Essen, 1st ed. (1990), p. 188-208). Of particular technical relevance here is a mixing power which is introduced on average over the entire reactor contents and at the end of the metered addition of all reactants is in the range from 0.8 to 5 W/l, preferably in the range from 0.8 to 3 W/l, with correspondingly higher local power inputs in the region of the stirrer units themselves and possibly in the case of relatively low fill levels. In order to achieve an optimal stirring effect, combinations of baffles (e.g. flat or tubular flow baffles) and cooling coils (or cooling candles) may be arranged within the reactor according to the general prior art and may also extend across the vessel base. The stirring power of the mixing apparatus may also be varied as a function of the fill level during the metered addition phase to ensure a particularly high energy input in critical reaction phases. For example, it may be advantageous to particularly vigorously mix solids-containing dispersions which may be present at the start of the reaction, for example, in the case of use of sucrose. Moreover, particularly when solid H-functional starter compounds are used, it should be ensured through the selection of the stirrer unit that sufficient dispersion of the solids in the reaction mixture is assured. It is preferable here to employ stirrer stages with close base clearance and particularly stirrer units suitable for suspension. In addition, the stirrer geometry should contribute to reducing foaming of reaction products. Foaming of reaction mixtures can be observed, for example, after the end of the metered addition and post-reaction phases when residual alkylene oxides are additionally removed under vacuum at absolute pressures in the range from 1 to 500 mbar. For such cases, stirrer units that achieve continuous mixing of the liquid surface have been found to be suitable. As required, the stirrer shaft has a base bearing and optionally further support bearings within the vessel. The stirrer shaft can be driven from the top or bottom (with a central or eccentric arrangement of the shaft).

It is alternatively also possible to achieve the necessary mixing and the necessary mixing power input exclusively via a pumped circulation circuit passing through a heat exchanger or to operate this pumped circulation circuit as a further mixing component in addition to the stirrer unit, thus effecting pumped circulation of the reactor contents as required (typically 1 to 50 times per hour). The specific mixing power introduced by means of pumped circulation, for example through an external heat exchanger or, in the case of recycling into the reactor, through a nozzle or injector, likewise amounts to values averaging from 0.8 to 5

W/l, preferably 0.8 to 3 W/l, wherein this is based on the liquid volume present in the reactor and the pumped circulation system after completed metered addition of all reactants.

It is recommended not only to perform the preparation of the polyoxyalkylene polyester polyols according to the invention in the absence of oxygen but also to handle and to store finished, salt-free and antioxidant-stabilized polyoxyalkylene polyester polyols according to the invention in the absence of oxygen. Inert gases suitable for this purpose are, for example, noble gases or nitrogen or carbon dioxide, noble gases or nitrogen being particularly suitable. The prevention of ingress of oxygen very substantially prevents further product discoloration and this is especially true at elevated temperatures which are generally utilized to facilitate handling of the finished products by lowering product viscosity. An inert gas atmosphere moreover results in the formation of markedly fewer peroxide groups which, through cleavage of polyether bonds present, contribute to the formation of further low molecular weight oxidative degradation products, for example acetaldehyde, methanol, formic acid, formic esters, acetone and formaldehyde. It is thus possible to minimize reductions in quality, lower the content of volatile organic compounds and prevent odour nuisance and impairment to health during the storage of the finished products.

The invention further provides polyoxyalkylene polyester polyols obtainable by the process according to the invention.

In one embodiment, the resulting polyoxyalkylene polyester polyol has an OH number between 100 and 300 mg KOH/g, wherein the OH number is determined according to the specification of DIN 53240.

The number-average OH functionality of the polyoxyalkylene polyester polyols obtainable by the process according to the invention is preferably at least 1.8, particularly preferably 1.8 to 3, wherein the number-average functionality $F_n$ is calculated according to the following formula (1), $$Fn = \frac{\sum_{i=1}^{i=n}(f_i \cdot m_i) + \sum_{j=1}^{j=m}(f_j \cdot m_j)}{\sum_{i=1}^{i=n} mi + \sum_{j=1}^{j=m} mj} \quad (1)$$

where $f_i$ is the H-functionality of the H-functional starter compound i and $m_i$ is the number of moles employed of H-functional starter compound i and $f_j$ is the H-functionality of the fatty acid ester j and mm is the number of moles of fatty acid ester j employed. For example, soybean oil bears no fatty acid residues having OH groups, and so $f_{soybean}=0$. Castor oil, on the other hand, has an average OH functionality of 2.7, and so $f_{castor\ oil}=2.7$.

In one embodiment, the resulting polyoxyalkylene polyester polyol has a color number measured by the Gardner method of 2.0 to 8.0, preferably of 3.0 to 7.5, wherein the color numbers measured by the Gardner method are determined according to the procedure specified in the experimental section.

The present invention further provides a process for preparing polyurethanes by reaction of the polyoxyalkylene polyester polyol according to the invention with a polyisocyanate. The polyoxyalkylene polyester polyols may be used as starting components for the preparation of solid or foamed polyurethane materials, for example coatings or rigid foams for insulation purposes, and also of polyurethane elastomers. The polyurethane materials and elastomers may also contain isocyanurate, allophanate and biuret structural units.

For preparation of the foamed or solid polyurethane materials the polyoxyalkylene polyester polyols according to the invention are optionally mixed with further isocyanate-reactive components and reacted with organic polyisocyanates, optionally in the presence of blowing agents, in the presence of catalysts and optionally in the presence of other additives such as cell stabilizers for example.

As further isocyanate-reactive components the polyoxyalkylene polyester polyols according to the invention may optionally be admixed with polyether polyols, polyester polyols, polycarbonate polyols, polyether carbonate polyols, polyester carbonate polyols, polyether ester carbonate polyols and/or low molecular weight chain extenders and/or crosslinkers having OH numbers or NH numbers of 6 to 1870 mg KOH/g.

Polyether polyols suitable therefor are obtainable for example by anionic polymerization of alkylene oxides in the presence of alkali metal hydroxides or alkali metal alkoxides as catalysts and with addition of at least one starter molecule containing 2 to 8 Zerewittinoff-active hydrogen atoms or by cationic polymerization of alkylene oxides in the presence of Lewis acids such as antimony pentachloride, boron trifluoride etherate or tris(pentafluorphenyl)borane. It will be appreciated that suitable catalysts also include those of the double metal cyanide complex type, so-called DMC catalysts, as described for example in U.S. Pat. Nos. 3,404,109, 3,829,505, 3,941,849, 5,158,922, 5,470,813, EP-A 700 949, EP-A 743 093, EP-A 761 708, WO 97/40086, WO 98/16310 and WO 00/47649. Suitable alkylene oxides and a number of suitable starter compounds have already been described in the preceding paragraphs. Also worthy of mention are tetrahydrofuran as a cyclic ether polymerizable under Lewis acidic conditions and water as the starter molecule. The polyether polyols, preferably polyoxypropylene-polyoxyethylene polyols, preferably have number-average molar masses of 200 to 8000 Da. Suitable polyether polyols further include polymer-modified polyether polyols, preferably graft polyether polyols, in particular those based on styrene and/or acrylonitrile, which are advantageously prepared in the abovementioned polyether polyols by in situ polymerization of acrylonitrile, styrene or preferably mixtures of styrene and acrylonitrile, for example in a weight ratio of 90:10 to 10:90, preferably 70:30 to 30:70, and also polyether polyol dispersions which contain inorganic fillers, polyureas, polyhydrazides, polyurethanes comprising bound tertiary amino groups and/or melamine as the disperse phase typically in an amount of 1% to 50% by weight, preferably 2% to 25% by weight.

Suitable polyester polyols may be prepared for example from organic dicarboxylic acids having 2 to 12 carbon atoms and polyhydric alcohols, preferably diols, having 2 to 12 carbon atoms, preferably 2 to 6 carbon atoms. Contemplated dicarboxylic acids include for example: Succinic acid, glutaric acid, adipic acid, suberic acid, azelaic acid, sebacic acid, decanedicarboxylic acid, dodecanedicarboxylic acid, maleic acid, fumaric acid, phthalic acid, isophthalic acid and terephthalic acid. The dicarboxylic acids may be used either individually or in admixture with one another. Instead of the free dicarboxylic acids it is also possible to employ the corresponding dicarboxylic acid derivatives, for example dicarboxylic mono- and/or diesters of alcohols having 1 to 4 carbon atoms or dicarboxylic anhydrides. It is preferable to employ dicarboxylic acid mixtures of succinic, glutaric and adipic acid in quantity ratios of for example 20 to 35/40 to 60/20 to 36 parts by weight and in particular adipic acid. Examples of dihydric and polyhydric alcohols are ethanediol, diethylene glycol, 1,2- and 1,3-propanediol, dipropylene glycol, methyl-1,3-propanediol, 1,4-butanediol, 1,5-pentanediol, 3-methyl-1,5-pentanediol, 1,6-hexanediol, neopentyl glycol, 1,10-decanediol, 1,12-dodecanediol, glycerol, trimethylolpropane and pentaerythritol. Preference is given to using 1,2-ethanediol, diethylene glycol, 1,4-butanediol, 1,6-hexanediol, glycerol, trimethylolpropane or mixtures of at least two of the recited polyhydric alcohols, in particular mixtures of ethanediol, 1,4-butanediol and 1,6-hexanediol, glycerol and/or trimethylolpropane. Also employable are for example polyester polyols made from lactones, for example ε-caprolactone, or hydroxycarboxylic acids, for example hydroxycaproic acid and hydroxyacetic acid.

To prepare the polyester polyols the organic, aromatic or aliphatic polycarboxylic acids and/or polycarboxylic acid derivatives and polyhydric alcohols may be subjected to polycondensation up to the desired acid and OH numbers in the absence of catalyst or in the presence of transesterification catalysts, advantageously in an atmosphere of inert gases, for example nitrogen, helium or argon, and also in the melt at temperatures of 150° C. to 300° C., preferably 180° C. to 230° C., optionally under reduced pressure. The acid number of such polyester polyols is advantageously less than 10 mg KOH/g, preferably less than 2.5 mg KOH/g.

In a preferred production process the esterification mixture is subjected to polycondensation at the abovementioned temperatures up to an acid number of 80 to 30 mg KOH/g, preferably 40 to 30 mg KOH/g, under standard pressure and subsequently at a pressure of less than 500 mbar, preferably 1 to 150 mbar. Contemplated esterification catalysts are for example iron, cadmium, cobalt, lead, zinc, antimony, magnesium, titanium and tin catalysts in the form of metals, metal oxides or metal salts. However, the polycondensation of aromatic or aliphatic carboxylic acids with polyhydric alcohols may also be performed in the liquid phase in the presence of diluents and/or entrainers, for example benzene, toluene, xylene or chlorobenzene, for azeotropic distillative removal of the water of condensation.

The ratio of dicarboxylic acid (derivative) and polyhydric alcohol to be chosen to obtain a desired OH number, functionality and viscosity, and the alcohol functionality to be chosen, may be simply determined by those skilled in the art.

Suitable polycarbonate polyols are those of the type known per se which may be prepared for example by reaction of diols, such as 1,2-propanediol, 1,4-butanediol, 1,6-hexanediol, diethylene glycol, triethylene glycol, tetraethylene glycol, oligo-tetramethylene glycol and/or oligo-hexamethylene glycol with diarylcarbonates and/or dialkyl carbonates, for example diphenyl carbonate, dimethyl carbonate and α-ω-bischloroformate or phosgene. The likewise suitable polyether carbonate polyols are obtained by copolymerization of cyclic epoxides and carbon dioxide; such copolymerizations are preferably performed under high pressure and catalyzed by double metal cyanide (DMC) compounds.

Low molecular weight bifunctional chain extenders and/or low molecular weight, preferably tri- or tetrafunctional, crosslinking agents may be admixed with the polyoxyalkylene polyester polyols for use according to the invention to modify the mechanical properties, in particular the hardness, of the PUR materials. Suitable chain extenders such as alkanediols, dialkylene glycols and polyalkylene polyols and crosslinking agents, for example tri- or tetravalent alcohols and oligomeric polyalkylene polyols having a functionality of 3 to 4, typically have molecular weights <800, preferably of 18 to 400, and in particular of 60 to 300 Da. Preferably employed chain extenders are alkanediols having 2 to 12 carbon atoms, for example ethanediol, 1,3-propanediol, 1,5-pentanediol, 1,6-hexanediol, 1,7-heptanediol, 1,8-octanediol, 1,9-nonanediol, 1,10-decanediol and in particular 1,4-butanediol and dialkylene glycols having 4 to 8 carbon atoms, for example diethylene glycol and dipropylene glycol and also polyoxyalkylene glycols. Also suitable are branched-chain and/or unsaturated alkanediols typically having not more than 12 carbon atoms, for example, 1,2-propanediol, 2-methyl-1,3-propanediol, 3-methyl-1,5-pentanediol, 2,2-dimethyl 1,3-propanediol, 2-butyl-2-ethyl-1,3-propanediol, 2-butene-1,4-diol and 2-butyne-1,4-diol, diesters of terephthalic acid with glycols having 2 to 4 carbon atoms, for example bis-ethylene glycol terephthalate or bis-1,4-butylene glycol terephthalate, and hydroxyalkylene ethers of hydroquinone or resorcinol, for example 1,4-di-(β-hydroxyethyl)hydroquinone or 1,3-(β-hydroxyethyl)resorcinol. It is also possible to use alkanolamines having 2 to 12 carbon atoms such as ethanolamine, 2-aminopropanol and 3-amino-2,2-dimethylpropanol, N-alkyl-dialkanolamines, for example N-methyl- and N-ethyl-di-ethanolamines, (cyclo)aliphatic diamines having 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diaminodicyclohexylmethane, N-alkyl-, N,N'-dialkyl-substituted and aromatic diamines which may also be substituted at the aromatic radical by alkyl groups having 1 to 20, preferably 1 to 4, carbon atoms in the N-alkyl radical, such as N,N'-diethyl-, N,N'-di-sec-pentyl-, N,N'-di-sec-hexyl-, N,N'-di-sec-decyl- and N,N'-dicyclohexyl-p- or -m-phenylenediamine, N,N'-dimethyl-, N,N'-diethyl-, N,N'-diisopropyl-, N,N'-di-sec-butyl-, N,N'-dicyclohexyl-4,4'-diamino-diphenylmethane, N,N'-di-sec-butylbenzidine, methylenebis(4-amino-3-benzoic acid methyl ester), 2,4-chloro-4,4'-diaminodiphenylmethane and 2,4- and 2,6-tolylenediamine. Suitable crosslinkers are for example glycerol, trimethylolpropane or pentaerythritol.

Also usable are mixtures of different chain extenders and crosslinkers with one another and mixtures of chain extenders and crosslinkers.

Suitable organic polyisocyanates are cycloaliphatic, araliphatic, aromatic and heterocyclic polyisocyanates, such as are described, for example, by W. Siefken in Justus Liebigs Annalen der Chemie, 562, pages 75 to 136, for example those of the formula Q(NCO)$_n$ in which n=2-4, preferably 2, and Q is an aliphatic hydrocarbon radical having 2-18, preferably 6-10, carbon atoms, a cycloaliphatic hydrocarbon radical having 4-15, preferably 5-10, carbon atoms, an aromatic hydrocarbon radical having 6-15, preferably 6-13, carbon atoms or an araliphatic hydrocarbon radical having 8-15, preferably 8-13, carbon atoms. Suitable compounds include for example ethylene diisocyanate, 1,4-tetramethylene diisocyanate, 1,6-hexamethylene diisocyanate (HDI), 1,12-dodecane diisocyanate, cyclobutane 1,3-diisocyanate, cyclohexane-1,3- and -1,4-diisocyanate and any desired mixtures of these isomers, 1-isocyanato-3,3,5-trimethyl-5-isocyanatomethylcyclohexane (DE-B 1 202 785, U.S. Pat. No. 3,401,190), 2,4- and 2,6-hexahydrotolylene diisocyanate and any desired mixtures of these isomers, hexahydro-1,3- and -1,4-phenylene diisocyanate, perhydro-2,4'- and -4,4'-diphenylmethane diisocyanate, 1,3- and 1,4-phenylene diisocyanate (DE-A 196 27 907), 1,4-durene diisocyanate (DDI), 4,4'-stilbene diisocyanate (DE-A 196 28 145), 3,3'- dimethyl-4,4'-biphenylene diisocyanate (DIBDI) (DE-A 195 09 819), 2,4- and 2,6-tolylene diisocyanate (TDI) and any desired mixtures of these isomers, diphenylmethane 2,4'-diisocyanate and/or diphenylmethane 4,4'-diisocyanate (MDI) or naphthylene 1,5-diisocyanate (NDI).

Also suitable according to the invention are for example: triphenylmethane 4,4',4"-triisocyanate, polyphenyl-polymethylene polyisocyanates, as obtained by aniline-formaldehyde condensation and subsequent phosgenation and described for example in GB-A 874 430 and GB-A 848 671, m- and p-isocyanatophenylsulfonyl isocyanates according to U.S. Pat. No. 3,454,606, perchlorinated aryl polyisocyanates, as described in U.S. Pat. No. 3,277,138, polyisocyanates containing carbodiimide groups, as described in U.S. Pat. No. 3,152,162 and in DE-A 25 04 400, 25 37 685 and 25 52 350, norbornane diisocyanates according to U.S. Pat. No. 3,492,301, polyisocyanates containing allophanate groups, as described in GB-A 994 890, BE-B 761 626 and NL-A 7 102 524, polyisocyanates containing isocyanurate groups, as described in US-A 3 001 9731, in DE-C 10 22 789, 12 22 067 and 1 027 394 and in DE-A 1 929 034 and 2 004 048, polyisocyanates containing urethane groups, as described for example in BE-B 752 261 or in U.S. Pat. Nos. 3,394,164 and 3,644,457, polyisocyanates containing acylated urea groups according to DE-C 1 230 778, polyisocyanates containing biuret groups, as described in U.S. Pat. Nos. 3,124,605, 3,201,372 and 3,124,605 and in GB-B 889 050, polyisocyanates prepared by telomerization reactions, as described in U.S. Pat. No. 3,654,106, polyisocyanates containing ester groups, as recited in GB-B 965 474 and 1 072 956, in U.S. Pat. No. 3,567,763 and in DE-C 12 31 688, reaction products of the abovementioned isocyanates with acetals according to DE-C 1 072 385, and polyisocyanates containing polymeric fatty acid esters according to U.S. Pat. No. 3,455,883.

It is also possible to use the distillation residues containing isocyanate groups generated during industrial isocyanate preparation, optionally dissolved in one or more of the abovementioned polyisocyanates. Any desired mixtures of the abovementioned polyisocyanates may also be used.

It is preferable to employ the industrially readily available polyisocyanates, for example 2,4- and 2,6-tolylene diisocyanate and any desired mixtures of these isomers ("TDI"); polyphenyl polymethylene polyisocyanates as prepared by aniline-formaldehyde condensation and subsequent phosgenation ("crude MDI"), and polyisocyanates comprising carbodiimide groups, urethane groups, allophanate groups, isocyanurate groups, urea groups or biuret groups ("modified polyisocyanates"), especially modified polyisocyanates deriving from 2,4- and/or 2,6-tolylene diisocyanate or from 4,4'- and/or 2,4'-diphenylmethane diisocyanate. Naphthylene 1,5-diisocyanate and mixtures of the abovementioned polyisocyanates are also well suitable.

It is also possible to use prepolymers containing isocyanate groups obtainable by reacting a portion or the total amount of the polyoxyalkylene polyester polyols for use according to the invention and/or a portion or the total amount of the above described isocyanate-reactive components for optional admixture with the polyoxyalkylene polyester polyols for use according to the invention with at least one aromatic di- or polyisocyanate from the group TDI, MDI, DIBDI, NDI, DDI, preferably with 4,4'-MDI and/or 2,4-TDI and/or 1,5-NDI, to afford a polyaddition product comprising urethane groups, preferably urethane groups and isocyanate groups. Such polyadducts have NCO contents of 0.05 to 40.0% by weight. In a preferably employed embodiment the prepolymers containing isocyanate groups are prepared by reaction of exclusively higher molecular weight polyhydroxyl compounds, i.e. the polyoxyalkylene polyester polyols for use according to the invention, and/or polyether polyols, polyester polyols or polycarbonate polyols with the polyisocyanates, preferably 4,4'-MDI, 2,4-TDI and/or 1,5-NDI.

The prepolymers containing isocyanate groups may be prepared in the presence of catalysts. However, it is also possible to prepare the prepolymers containing isocyanate groups in the absence of catalysts and to add these to the reaction mixture for preparing the PUR materials.

The blowing agent for optional use for the purpose of foam preparation may be water which reacts in situ with the organic polyisocyanates or with the prepolymers comprising isocyanate groups to form carbon dioxide and amino groups, the latter in turn undergoing further reaction with further isocyanate groups to afford urea groups and thus acting as chain extenders. If water is added to the polyurethane formulation to adjust the desired density this is typically employed in amounts of 0.001% to 6.0% by weight based on the weight of the employed polyoxyalkylene polyester polyols according to the invention, optionally further isocyanate-reactive components, the catalysts and further additives.

Blowing agents that may be employed as physical blowing agents instead of water or preferably in combination with water also include gases or highly volatile inorganic or organic substances which evaporate under the influence of the exothermic polyaddition reaction and advantageously have a boiling point at standard pressure in the range from −40° C. to 120° C., preferably from 10° C. to 90° C. Blowing agents that may be employed include for example acetone, ethyl acetate, methyl acetate, halogen-substituted alkanes such as methylene chloride, chloroform, ethylidene chloride, vinylidene chloride, monofluorotrichloromethane, chlorodifluoromethane, dichlorodifluoromethane, HFCs such as R 134a, R 245fa and R 365mfc, and also unsubstituted alkanes such as butane, n-pentane, isopentane, cyclopentane, hexane, heptane or diethyl ether. Suitable inorganic blowing agents include for example air, $CO_2$ or $N_2O$. A blowing effect can also be achieved by addition of compounds which at temperatures above room temperature decompose with elimination of gases, for example nitrogen and/or carbon dioxide, such as azo compounds, for example azodicarbonamide or azoisobutyronitrile, or salts such as ammonium bicarbonate, ammonium carbamate or ammonium salts of organic carboxylic acids, for example the monoammonium salts of malonic acid, boric acid, formic acid or acetic acid. Further examples of blowing agents, particulars concerning the use of blowing agents and criteria for blowing agent selection are described in R. Vieweg, A. Höchtlen (eds.): "Kunststoff-Handbuch", Volume VII, Carl-Hanser-Verlag, Munich 1966, pp. 108f, 453ff and 507-510 as well as in D. Randall, S. Lee (eds.): "The Polyurethanes Book", John Wiley & Sons, Ltd., London 2002, pp. 127-136, 232-233 and 261.

The advantageously usable amount of solid blowing agents, low-boiling liquids or gases, each of which may be employed individually or in the form of mixtures, for example as liquid or gas mixtures or as gas-liquid mixtures depends on the desired PUR material density and the amount of water employed. The required amounts may be easily determined experimentally. Satisfactory results are typically achieved using solid amounts of 0.5 to 35 parts by weight, preferably 2 to 15 parts by weight, liquid amounts of 1 to 30 parts by weight, preferably 3 to 18 parts by weight, and/or gas amounts of 0.01 to 80 parts by weight, preferably of 10 to 35 parts by weight, in each case based on the weight of compounds having isocyanate-reactive hydrogen atoms and the weight of the polyisocyanates employed. The gas loading with, for example, air, carbon dioxide, nitrogen and/or helium may be effected either via the mixture of the employed polyoxyalkylene polyester polyols according to the invention with optionally further isocyanate-reactive components, the catalysts and further additives or via the polyisocyanates or via both the mixture of the employed polyoxyalkylene polyester polyols according to the invention with optionally further isocyanate-reactive components, the catalysts and other additives on the one hand and the polyisocyanates on the other.

It is also possible to prepare compact PUR materials, for example PUR elastomers, castable PUR elastomers or coatings, in the absence of moisture and physical or chemical blowing agents.

Amine catalysts that are familiar to those skilled in the art and have proven advantageous for polyurethane material preparation are for example tertiary amines such as triethylamine, tributylamine, N-methyl-morpholine, N-ethyl-morpholine, N,N,N',N'-tetramethylethylenediamine, pentamethyldiethylenetriamine and higher homologs (DE-OS 26 24 527 and 26 24 528), 1,4-diaza-bicyclo-(2,2,2)-octane, N-methyl-N'-dimethylaminoethylpiperazine, bis(dimethylaminoalkyl)piperazine (DE-A 26 36 787), N,N-dimethylbenzylamine, N,N-dimethylcyclohexylamine, N,N-diethylbenzylamine, bis(N,N-diethylaminoethyladipate, N,N,N', N'-tetramethyl-1,3-butanediamine, N,N-dimethyl-β-phenylethylamine, bis(dimethylaminopropyl)urea, 1,2-dimethylimidazole, 2-methylimidazole, monocyclic and bicyclic amidines (DE-A 17 20 633), bis(dialkylamino)alkyl ethers (U.S. Pat. No. 3,330,782, DE-B 10 30 558, DE-A 18 04 361 and 26 18 280) and tertiary amines comprising amide groups (preferably formamide groups) according to DE-A 25 23 633 and 27 32 292). Suitable catalysts further include Mannich bases known per se and composed of secondary amines, such as dimethylamine, and aldehydes, preferably formaldehyde, or ketones such as acetone, methyl ethyl ketone or cyclohexanone and phenols, such as phenol or alkyl-substituted phenols. Tertiary amines comprising isocyanate-active hydrogen atoms as catalysts include for example triethanolamine, triisopropanolamine, N-methyldiethanolamine, N-ethyldiethanolamine, N,N-dimethylethanolamine, reaction products thereof with alkylene oxides such as propylene oxide and/or ethylene oxide and secondary-tertiary amines according to DE-A 27 32 292. Catalysts that may be employed further include silaamines having carbon-silicon bonds as described in U.S. Pat. No. 3,620, 984, for example 2,2,4-trimethyl-2-silamorpholine and 1,3-diethylaminomethyltetramethyldisiloxane. Nitrogen-containing bases such as tetraalkylammonium hydroxides and hexahydrotriazines are also contemplated. The reaction between NCO groups and Zerewitinoff-active hydrogen atoms is also greatly accelerated by lactams and azalactams by initially forming an adduct between the lactam and the compound comprising acidic hydrogen.

When the catalysis of the polyurethane reaction employs amines as catalysts it must naturally be taken into account that polyoxyalkylene polyester polyols prepared according to the invention under amine catalysis may already contain catalytically active amines. However a person skilled in the art can easily determine the amounts of any amine catalysts still to be added via suitable experimental series.

Catalysts that may be employed for this purpose further include customary organometallic compounds, preferably organotin compounds such as tin(II) salts of organic carboxylic acids, for example tin(II) acetate, tin(II) octoate, tin(II) ethylhexoate and tin(II) taurate, and the dialkyltin(IV) salts of mineral acids or organic carboxylic acids, for example dibutyltin diacetate, dibutyltin dilaurate, dibutyltin maleate, dioctyltin diacetate and dibutyltin dichloride. Sulfur-containing compounds such as di-n-octyltin mercaptide (U.S. Pat. No. 3,645,927) can also be used.

Catalysts which especially catalyze the trimerization of NCO groups are used for preparing polyurethane materials having high proportions of so-called poly(isocyanurate) structures ("PIR foams"). The preparation of such materials typically employs formulations with significant excesses of NCO groups over OH groups. PIR foams are typically prepared at indexes of 180 to 450, wherein the index is defined as the ratio of isocyanate groups to hydroxyl groups multiplied by a factor of 100. Catalysts which contribute to the development of isocyanurate structures are metal salts such as for example potassium or sodium acetate, sodium octoate and amino compounds such as 1,3,5-tris(3-dimethylaminopropyl)hexahydrotriazine.

The catalysts/catalyst combinations are generally employed in an amount between about 0.001% and 10% by weight, in particular 0.01% to 4% by weight, based on the total amount of compounds having at least two isocyanate-reactive hydrogen atoms.

Additives may optionally also be used in the preparation of the compact or foamed PUR materials Examples include surface-active additives, such as emulsifiers, foam stabilizers, cell regulators, flame retardants, nucleating agents, oxidation retarders, stabilizers, lubricating and demolding agents, dyes, dispersing aids and pigments. Suitable emulsifiers are for example the sodium salts of castor oil sulfonates or salts of fatty acids with amines such as diethylamine oleate or diethanolamine stearate. Alkali metal or ammonium salts of sulfonic acids such as for instance of dodecylbenzenesulfonic acid or dinaphthylmethanedisulfonic acid or of fatty acids such as ricinoleic acid or of polymeric fatty acids can also be used as surface-active additives. Suitable foam stabilizers particularly include polyethersiloxanes. The construction of these compounds is generally such that copolymers of ethylene oxide and propylene oxide are attached to a polydimethylsiloxane radical. Such foam stabilizers may be reactive towards isocyanates or unreactive towards isocyanates due to etherification of the terminal OH groups. They are described, for example, in U.S. Pat. Nos. 2,834,748, 2,917,480 and 3,629,308. General structures of such foam stabilizers are reproduced in G. Oertel (ed.): "Kunststoff-Handbuch", Volume VII, Carl-Hanser-Verlag, Munich, Vienna 1993, pp. 113-115. Of particular interest are polysiloxane-polyoxyalkylene copolymers multiply branched via allophanate groups according to DE-A 25 58 523. Other organopolysiloxanes, ethoxylated alkylphenols, ethoxylated fatty alcohols, paraffin oils and cell regulators such as paraffins, fatty alcohols and dimethylpolysiloxanes are also suitable. Also suitable for improving emulsifying action, dispersion of the filler, cell structure and/or for stabilization thereof are oligomeric polyacrylates having polyoxyalkylene and fluoroalkane radicals as side groups. The surface-active substances are typically employed in amounts of 0.01 to 5 parts by weight based on 100 parts by weight of the total amount of compounds having isocyanate-reactive hydrogen atoms. It is also possible to add reaction retarders, for example acidic substances such as hydrochloric acid or organic acids and acid halides, and pigments or dyes and flame retardants known per se, for example tris(chloroethyl) phosphate, triethyl phosphate, tricresyl phosphate or ammonium phosphate and polyphosphate, stabilizers against the influence of aging and weathering, plasticizers and fungicidal and bactericidal substances. Further examples of surface-active additives and foam stabilizers and cell regulators, reaction retarders, stabilizers, flame retardants, plasticizers, dyes and fillers and fungistatic and bacteriostatic substances for optional co-use according to the invention and details concerning use and mode of action of these additives are described in R. Vieweg and A. Höchtlen (Eds.): "Kunststoff-Handbuch", Volume VII, Carl-Hanser-Verlag, Munich 1966, pp. 103-113.

The ratio of the isocyanate groups in the polyisocyanates to the isocyanate-reactive hydrogens present in the total amount of compounds having isocyanate-reactive hydrogen atoms may be varied within wide ranges to prepare the PUR/PIR materials. Ratios of 0.7:1 to 5:1 are customary.

The PUR materials may be prepared by the processes described in the literature, for example the one-shot process or the prepolymer process, using mixing devices known in principle to those skilled in the art.

Examples of the Preparation of the Polyoxyalkylene Polyester Polyols According to the Invention
Raw Materials Employed:
  Soybean Oil:
  Soybean oil (refined, i.e. delecithinated, neutralized, decolorized and steam stripped), obtained from Sigma-Aldrich Chemie GmbH, Munich.
Irganox® 1076:
  Octadecyl 3-(3,5-di-tert-butyl-4-hydroxyphenyl)propionate.
Methods:
  OH Number Determination
  OH numbers were determined according to the specification of DIN 53240.
Determination of Viscosity
  Viscosities were determined according to the specification of DIN 53019 using a Stabinger viscometer (Stabinger SVM 3000, manufacturer: Anton Paar)
Determination of Acid Number
  Acid number was determined potentiometrically according to the specification of DIN EN ISO 2114.
Determination of Color Number
  Color numbers were determined by the Gardner method (ASTM D 4890-88). Unless otherwise stated, the samples were dissolved in dimethyl sulfoxide in a weight ratio of 1:2 to determine color number.

EXAMPLE 1 (COMPARATIVE)

A 10 l laboratory autoclave was charged with 516.6 g of diethylene glycol (DEG), 357.9 g of glycerol, 1703.4 g of soybean oil, 9.533 g of N-methylimidazole (NMI) and 2179.4 g of phthalic anhydride under a nitrogen atmosphere. After closure of the reactor, oxygen was removed at room temperature by 5-fold pressurization of the autoclave with nitrogen to an absolute pressure of 4 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/l based on the liquid volume in the reactor after completed metered addition of all reactants) and the reactor pressure was adjusted to 2.5 bar with nitrogen. At this temperature a total of 1278.4 g of ethylene oxide were metered in over a period of altogether 6.2 h. A post-reaction time of 4.4 h followed after termination of the ethylene oxide metered addition. The product was then baked out at 120° C. over a duration of 25 minutes under vacuum (25 mbar). 3.073 g of IRGANOX® 1076 were added during the cooling phase. A product biphasic at 40° C. and having an OH number of 212 mg KOH/g and an acid number of 44 ppm KOH was obtained. It had a viscosity of 5950 mPas at 25° C. The color number (Gardner) was 8.3.

EXAMPLE 2 (COMPARATIVE)

A 10 l laboratory autoclave was charged with 513.2 g of DEG, 356.4 g of glycerol, 1703.3 g of soybean oil, 9.025 g of NMI and 2179.4 g of phthalic anhydride under a nitrogen atmosphere. After closure of the reactor, oxygen was removed at room temperature by 5-fold pressurization of the autoclave with nitrogen to an absolute pressure of 4 bar and subsequent release of the positive pressure to standard pressure. The reactor was then heated to 120° C. with stirring (100 rpm, grid stirrer). After achieving this temperature the stirrer speed was increased to 350 rpm (corresponding to a specific power input of 2.1 W/l based on the liquid volume in the reactor after completed metered addition of all reactants) and the reactor pressure was adjusted to 2.6 bar with nitrogen. At this temperature a total of 1278.5 g of ethylene oxide were metered in. The first 840 g of ethylene oxide were supplied at a metered addition rate of 140 g/h while the remaining ethylene oxide amount was supplied at a metered addition rate of 216 g/h. A post-reaction time of 6.2 h followed after termination of the ethylene oxide metered addition. The product was then baked out at 120° C. over a duration of 30 minutes under vacuum (15 mbar). 3.016 g of IRGANOX® 1076 were added during the cooling phase. A product monophasic at 40° C. and having an OH number of 209 mg KOH/g and an acid number of 4 ppm KOH was obtained. It had a viscosity of 6725 mPas at 25° C. The color number (Gardner) was 9.3.

EXAMPLE 3 (COMPARATIVE)

A 10 l laboratory autoclave was charged with 513.4 g of DEG, 356.8 g of glycerol, 1703.4 g of soybean oil, 9.049 g of NMI and 2178.0 g of phthalic anhydride under a nitrogen atmosphere. After closure of the reactor, oxygen was removed by 4-fold pressurization of the autoclave with nitrogen to an absolute pressure of 4 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/l based on the liquid volume in the reactor after completed metered addition of all reactants) and the reactor pressure was adjusted to 242 bar with nitrogen. At this temperature a total of 1278.7 g of ethylene oxide were metered in at a uniform metered addition rate of 220 g/h. After 426.3 g of ethylene oxide had been metered in, the mixture was post-reacted for 15 minutes and the reactor was allowed to cool overnight with the stirrer switched off After restarting the stirrer and reheating to 120° C., the remaining ethylene oxide was metered in. A post-reaction time of 2.72 h followed after termination of the ethylene oxide metered addition. The product was then baked out at 120° C. over a duration of 40 minutes under vacuum (27 mbar). 3.005 g of IRGANOX® 1076 were added at about 80° C. during the cooling phase. A product biphasic at 40° C. and having an OH number of 208 mg KOH/g and an acid number of 0 ppm KOH was obtained. It had a viscosity of 6220 mPas at 25° C. The color number (Gardner) was 8.9.

EXAMPLE 4 (COMPARATIVE)

A 10 l laboratory autoclave was charged with 514.3 g of DEG, 356.4 g of glycerol, 1704.3 g of soybean oil and 9.027 g of NMI under a nitrogen atmosphere. After closure of the reactor, oxygen was removed by 4-fold pressurization of the autoclave with nitrogen to an absolute pressure of 4 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/1 based on the liquid volume in the reactor after completed metered addition of all reactants) and the reactor pressure was adjusted to 2.4 bar with nitrogen. At this temperature 542.4 g of ethylene oxide were initially metered in at a metered addition rate of 213 g/h. This was followed by a post-reaction of 1.35 h and the reactor was allowed to cool to room temperature overnight with the stirrer switched off. 2177.9 g of phthalic anhydride were then added through the filler port. After closure of the reactor and restarting of the stirrer (200 rpm) oxygen was removed at room temperature by 4-fold pressurization of the autoclave with nitrogen to an absolute pressure of 4 bar and subsequent release of the positive pressure to standard pressure. The mixture was heated to 120° C. with stirring at 200 rpm. After achieving this temperature the stirrer speed was increased to 350 rpm and a further 736.2 g of ethylene oxide were supplied at a metered addition rate of 217 g/h. A post-reaction of 3.1 h in duration followed after termination of the ethylene oxide metered addition. The product was then baked out at 120° C. over a duration of 40 minutes under vacuum (25 mbar). 3.006 g of IRGANOX® 1076 were added at about 80° C. during the cooling phase. A product which was light-colored but nevertheless biphasic at 40° C. and had an OH number of 193 mg KOH/g and an acid number of 43 ppm KOH was obtained. Viscosity (25° C.) and color number were not determinable.

EXAMPLE 5 (COMPARATIVE)

A 10 l laboratory autoclave was charged with 514.3 g of DEG, 357.9 g of glycerol and 9.024 g of NMI under a nitrogen atmosphere. After closure of the reactor, oxygen was removed by 4-fold pressurization of the autoclave with nitrogen to an absolute pressure of 4 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/1 based on the liquid volume in the reactor after completed metered addition of all reactants) and the reactor pressure was adjusted to 2.4 bar with nitrogen. At this temperature 2243.3 g of ethylene oxide were initially metered in at a metered addition rate of 500 g/h. This was followed by a post-reaction of 1.02 h and the reactor was allowed to cool to room temperature overnight with the stirrer switched off. 2179.4 g of phthalic anhydride were then added through the filler port. After closure of the reactor and restarting of the stirrer (200 rpm) oxygen was removed at room temperature by 4-fold pressurization of the autoclave with nitrogen to an absolute pressure of 5 bar and subsequent release of the positive pressure to standard pressure. The mixture was heated to 120° C. with stirring at 200 rpm. After achieving this temperature the reactor pressure was increased to 2.4 bar, the stirrer speed was increased to 350 rpm and 738.8 g of ethylene oxide were supplied at a metered addition rate of 220 g/h. A post-reaction of 3.4 h in duration followed after termination of the ethylene oxide metered addition. The product was then baked out at 120° C. over a duration of 40 minutes under vacuum (15 mbar). 3.002 g of IRGANOX® 1076 were added at about 80° C. during the cooling phase. A product which was dark and monophasic at 40° C. and had an OH number of 201 mg KOH/g and an acid number of 14 ppm KOH was obtained. It had a viscosity of 8790 mPas at 25° C. The color number (Gardner) was 10.2.

EXAMPLE 6 (COMPARATIVE)

A 10 l laboratory autoclave was charged with 513.2 g of DEG, 356.4 g of glycerol and 9.119 g of NMI under a nitrogen atmosphere. After closure of the reactor, oxygen was removed by 4-fold pressurization of the autoclave with nitrogen to an absolute pressure of 5 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/1 based on the liquid volume in the reactor after completed metered addition of all reactants) and the reactor pressure was adjusted to 2.4 bar with nitrogen. At this temperature 2126.3 g of ethylene oxide were initially metered in at a metered addition rate of 500 g/h. This was followed by a post-reaction of 0.67 h and the reactor was allowed to cool to room temperature overnight with the stirrer switched off. 2178.3 g of phthalic anhydride were then added through the filler port. After closure of the reactor and restarting of the stirrer (200 rpm) oxygen was removed at room temperature by 4-fold pressurization of the autoclave with nitrogen to an absolute pressure of 5 bar and subsequent release of the positive pressure to standard pressure. The mixture was heated to 120° C. with stirring at 200 rpm. After achieving this temperature the reactor pressure was increased to 2.4 bar, the stirrer speed was increased to 350 rpm and 855.3 g of ethylene oxide were supplied at a metered addition rate of 220 g/h. A post-reaction of 6 h in duration followed after termination of the ethylene oxide metered addition. The product was then baked out at 120° C. over a duration of 40 minutes under vacuum (20 mbar). 2.999 g of IRGANOX® 1076 were added at about 80° C. during the cooling phase. A product which was dark and monophasic at 40° C. and had an OH number of 204 mg KOH/g and an acid number of 3 ppm KOH was obtained. It had a viscosity of 9325 mPas at 25° C. The color number (Gardner) was 16.3.

EXAMPLE 7 (COMPARATIVE)

A 10 l laboratory autoclave was charged with 513.1 g of DEG, 357.4 g of glycerol, 9.013 g of NMI and 2179.1 g of phthalic anhydride under a nitrogen atmosphere. After closure of the reactor, oxygen was removed by 4-fold pressurization of the autoclave with nitrogen to an absolute pressure of 5 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/1 based on the liquid volume in the reactor after completed metered addition of all reactants) and the reactor pressure was adjusted to 2.1 bar with nitrogen. At this temperature 2243.3 g of ethylene oxide were initially metered in over 4.83 h. This was followed by a short post-reaction and a further 738.7 g of ethylene oxide were supplied at a metered addition rate of 220 g/h. A post-reaction of 3.3 h in duration followed after termination of the ethylene oxide metered addition. The product was then baked out at 120° C. over a duration of 50 minutes under vacuum (13 mbar). 2.999 g of IRGANOX® 1076 were added at about 80° C. during the cooling phase. A product which was very dark and monophasic at 40° C. and had an OH number of 215 mg KOH/g and an acid number of 0 ppm KOH was obtained. It had a viscosity of 7300 mPas at 25° C. The color number (Gardner) exceeded 20.

EXAMPLE 8 (COMPARATIVE)

A 10 l laboratory autoclave was charged with 513.6 g of DEG, 359.5 g of glycerol, 1703.6 g of soybean oil and 9.018 g of NMI under a nitrogen atmosphere. After closure of the reactor, oxygen was removed by 4-fold pressurization of the autoclave with nitrogen to an absolute pressure of 5 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/l based on the liquid volume in the reactor after completed metered addition of all reactants) and the reactor pressure was adjusted to 2.2 bar with nitrogen. At this temperature initially 852.5 g of ethylene oxide were metered in over a period of 3.05 h. This was followed by a post-reaction of 0.65 h and the reactor was allowed to cool to room temperature overnight with the stirrer switched off 2179.5 g of phthalic anhydride were then added through the filler port. After closure of the reactor and restarting of the stirrer (200 rpm) oxygen was removed at room temperature by 4-fold pressurization of the autoclave with nitrogen to an absolute pressure of 5 bar and subsequent release of the positive pressure to standard pressure. The mixture was heated to 120° C. with stirring at 200 rpm. After achieving this temperature the stirrer speed was increased to 350 rpm, the reactor pressure was increased to 2.3 bar and a further 426.1 g of ethylene oxide were supplied over a period of 3.01 h. A post-reaction of 0.53 h in duration followed after termination of the ethylene oxide metered addition. The product was then baked out at 120° C. over a duration of 1.1 h under vacuum (20 mbar). 2.995 g of IRGANOX® 1076 were added at about 80° C. during the cooling phase. A product biphasic at 40° C. and having an OH number of 139 mg KOH/g and an acid number of 56.9 mg KOH/g was obtained. Viscosity (25° C.) and color number were not determinable due to the biphasic nature of the end product.

EXAMPLE 9 (INVENTIVE)

A 10 l laboratory autoclave was charged with 513.6 g of DEG, 360.3 g of glycerol, 1703.2 g of soybean oil and 9.037 g of NMI under a nitrogen atmosphere. After closure of the reactor, oxygen was removed by 4-fold pressurization of the autoclave with nitrogen to an absolute pressure of 4.5 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/l based on the liquid volume in the reactor after completed metered addition of all reactants) and the reactor pressure was adjusted to 2.6 bar with nitrogen. At this temperature initially 426.1 g of ethylene oxide were metered in over a period of 3.07 h. This was followed by a post-reaction of 0.8 h and the reactor was allowed to cool to room temperature overnight with the stirrer switched off 2178.8 g of phthalic anhydride were then added through the filler port. After closure of the reactor and restarting of the stirrer (200 rpm) oxygen was removed at room temperature by 4-fold pressurization of the autoclave with nitrogen to an absolute pressure of 5 bar and subsequent release of the positive pressure to standard pressure. The mixture was heated to 120° C. with stirring at 200 rpm. After achieving this temperature the reactor pressure was increased to 2.6 bar, the stirrer speed was increased to 350 rpm and 852.5 g of ethylene oxide were supplied over a period of 3.3 h. A post-reaction of 3.78 h in duration followed after termination of the ethylene oxide metered addition. The product was then baked out at 120° C. over a duration of 31 minutes under vacuum (23 mbar). 3.037 g of IRGANOX® 1076 were added at about 80° C. during the cooling phase. A product monophasic at 40° C. and having an OH number of 202 mg KOH/g and an acid number of <0.1 ppm KOH was obtained. It had a viscosity of 6690 mPas at 25° C. The color number (Gardner) was 5.5.

EXAMPLE 10 (INVENTIVE)

A 10 l laboratory autoclave was charged with 522.4 g of DEG, 364.2 g of glycerol, 1734.1 g of soybean oil and 9.221 g of NMI under a nitrogen atmosphere. After closure of the reactor, oxygen was removed by 4-fold pressurization of the autoclave with nitrogen to an absolute pressure of 5 bar and subsequent release of the positive pressure to standard pressure. The reactor was then heated to 120° C. with stirring (200 rpm, grid stirrer). After achieving this temperature the stirrer speed was increased to 350 rpm (corresponding to a specific power input of 2.1 W/l based on the liquid volume in the reactor after completed metered addition of all reactants) and the reactor pressure was adjusted to 2.5 bar with nitrogen. At this temperature initially 223.2 g of ethylene oxide were metered in over a period of 1.12 h. This was followed by a post-reaction of 1.35 h and the reactor was allowed to cool to room temperature overnight with the stirrer switched off 2217.6 g of phthalic anhydride were then added through the filler port. After closure of the reactor and restarting of the stirrer (200 rpm) oxygen was removed at room temperature by 4-fold pressurization of the autoclave with nitrogen to an absolute pressure of 5 bar and subsequent release of the positive pressure to standard pressure. The mixture was heated to 120° C. with stirring at 200 rpm. After achieving this temperature the reactor pressure was increased to 2.7 bar, the stirrer speed was increased to 350 rpm and 1074.2 g of ethylene oxide were supplied over a period of 4.5 h. A post-reaction of 5.7 h in duration followed after termination of the ethylene oxide metered addition. The product was then baked out at 120° C. over a duration of 27 minutes under vacuum (18 mbar). 3.021 g of IRGANOX® 1076 were added at about 80° C. during the cooling phase. A product monophasic at 40° C. and having an OH number of 202 mg KOH/g and an acid number of 8 ppm KOH was obtained. It had a viscosity of 6285 mPas at 25° C. The color number (Gardner) was 7.2.

EXAMPLE 11 (INVENTIVE)

A 10 l laboratory autoclave was charged with 514.3 g of DEG, 357.5 g of glycerol, 1703.2 g of soybean oil and 9.377 g of NMI under a nitrogen atmosphere. After closure of the reactor, oxygen was removed by 4-fold pressurization of the autoclave with nitrogen to an absolute pressure of 5 bar and subsequent release of the positive pressure to standard pressure. The reactor was then heated to 120° C. with stirring (200 rpm, grid stirrer). After achieving this temperature the stirrer speed was increased to 300 rpm (corresponding to a specific power input of 1.2 W/l based on the liquid volume in the reactor after completed metered addition of all reactants) and the reactor pressure was adjusted to 2.8 bar with nitrogen. At this temperature initially 426.2 g of ethylene oxide were metered in over a period of 3.03 h. This was followed by a post-reaction of 0.66 h and the reactor was allowed to cool to room temperature overnight with the stirrer switched off 2178.5 g of phthalic anhydride were then added through the filler port. After closure of the reactor and restarting of the stirrer (200 rpm) oxygen was removed at room temperature by 4-fold pressurization of the autoclave with nitrogen to an absolute pressure of 5 bar and subsequent release of the positive pressure to standard pressure. The mixture was heated to 120° C. with stirring at 200 rpm. After achieving this temperature the reactor pressure was increased to 2.5 bar, the stirrer speed was increased to 300 rpm and 852.5 g of ethylene oxide were supplied over a period of 3.02 h. A post-reaction of 5.4 h in duration followed after termination of the ethylene oxide metered addition. The product was then baked out at 120° C. over a duration of 60 minutes under vacuum (24 mbar). 3.073 g of IRGANOX® 1076 were added at about 80° C. during the cooling phase. A product monophasic at 40° C. and having an OH number of 201 mg KOH/g was obtained.

It had a viscosity of 5805 mPas at 25° C. The color number (Gardner) was 6.7.

EXAMPLE 12 (INVENTIVE)

A 10 l laboratory autoclave was charged with 513.2 g of DEG, 358.1 g of glycerol, 1703.2 g of soybean oil and 9.012 g of NMI under a nitrogen atmosphere. After closure of the reactor, oxygen was removed by 4-fold pressurization of the autoclave with nitrogen to an absolute pressure of 5 bar and subsequent release of the positive pressure to standard pressure. The reactor was then heated to 120° C. with stirring (200 rpm, grid stirrer). After achieving this temperature the stirrer speed was increased to 250 rpm (corresponding to a specific power input of 0.8 W/l based on the liquid volume in the reactor after completed metered addition of all reactants) and the reactor pressure was adjusted to 2.5 bar with nitrogen. At this temperature initially 426.1 g of ethylene oxide were metered in over a period of 3.10 h. This was followed by a post-reaction of 1.27 h and the reactor was allowed to cool to room temperature overnight with the stirrer switched off 2179.8 g of phthalic anhydride were then added through the filler port. After closure of the reactor and restarting of the stirrer (250 rpm) oxygen was removed at room temperature by 4-fold pressurization of the autoclave with nitrogen to an absolute pressure of 5 bar and subsequent release of the positive pressure to standard pressure. The mixture was heated to 120° C. with stirring at 250 rpm. After achieving this temperature the reactor pressure was increased to 2.5 bar, the stirrer speed was kept at 250 rpm and 852.5 g of ethylene oxide were supplied over a period of 3.70 h. A post-reaction of 5.0 h in duration followed after termination of the ethylene oxide metered addition. The product was then baked out at 120° C. over a duration of 60 minutes under vacuum (23 mbar). 3.068 g of IRGANOX® 1076 were added at about 80° C. during the cooling phase. A product monophasic at 40° C. and having an OH number of 201 mg KOH/g was obtained.

It had a viscosity of 6780 mPas at 25° C. The color number (Gardner) was 6.5.

TABLE 1

(unless otherwise stated, all tests were performed with a specific stirring power input of 2.1 W/l based on the liquid volume in the reactor after completed metered addition of all reactants)

| Example | Moles of alkylene oxide/ moles of OH groups supplied in step (ii) | Fatty acid esters present | Employed amount of substance of cyclic dicarboxylic anhydride [mol] | Amount of alkylene oxide supplied in step (iv) [mol] | Molar ratio of alkylene oxide in step (iv)/cyclic dicarboxylic anhydride | OHN [mg KOH/g] | Acid number | Viscosity at 25° C. [mPas] | Color number (Gardner) | Monophasic at 40° C.? |
|---|---|---|---|---|---|---|---|---|---|---|
| 1 (comp.) | 0.00 | yes | 14.72 | 29.02 | 1.97 | 212 | 44 ppm KOH | 5950 | 8.3 | no |
| 2 (comp.)* | 0.00 | yes | 14.72 | 29.02 | 1.97 | 209 | 4 ppm KOH | 6725 | 9.3 | yes |
| 3 (comp.)** | 0.00 | yes | 14.71 | 29.03 | 1.97 | 208 | 0 ppm KOH | 6220 | 8.9 | no |
| 4 (comp.) | 0.58 | yes | 14.71 | 16.71 | 1.14 | 193 | 43 ppm KOH | n. d.*** | n. d. | no |
| 5 (comp.) | 2.38 | no | 14.72 | 16.77 | 1.14 | 201 | 14 ppm KOH | 8790 | 10.2 | yes |
| 6 (comp.) | 2.26 | no | 14.71 | 19.42 | 1.32 | 204 | 3 ppm KOH | 9325 | 16.3 | yes |
| 7 (comp.) | 0.00 | no | 14.71 | 67.70 | 4.60 | 215 | 0 ppm KOH | 7300 | >20 | yes |
| 8 (comp.) | 0.90 | yes | 14.72 | 9.67 | 0.65 | 139 | 56.9 mg KOH/g | n. d. | n. d. | no |
| 9 (inv.) | 0.45 | yes | 14.71 | 19.35 | 1.31 | 202 | 0 ppm KOH | 6690 | 5.5 | yes |
| 10 (inv.) | 0.23 | yes | 14.97 | 24.39 | 1.62 | 202 | 8 ppm KOH | 6285 | 7.2 | yes |
| 11 (inv.)**** | 0.45 | yes | 14.71 | 19.35 | 1.31 | 201 | n. d. | 5805 | 6.7 | yes |
| 12 (inv.)**** | 0.45 | yes | 14.72 | 19.35 | 1.31 | 201 | n. d. | 6780 | 6.5 | yes |

*Epoxide addition rate reduced relative to example 1

**After metered addition of ⅓ of the epoxide amount to be added, the metered addition was interrupted overnight and the mixture allowed to cool before resumption of the reaction the next day.

n. d. : not determined

****: Example 11: Specific stirring power input: 1.2 W/l; Example 12: Specific stirring power input: 0.8 W/l OHN: OH number

The invention claimed is:

1. A process for preparing a polyoxyalkylene polyester polyol by reaction of a starter compound (1) having Zerewitinoff-active H atoms, a cyclic dicarboxylic anhydride (2) and a fatty acid ester (3) with an alkylene oxide (4) in the presence of a basic catalyst (5) comprising:
   (i) providing a mixture (i) comprising the starter compound (1) and the fatty acid ester (3), wherein the mixture (i) contains no cyclic dicarboxylic anhydride (2);
   (ii) reacting the mixture (i) from step (i) with a portion (v1) of the alkylene oxide (4), wherein at least 0.15 mol of alkylene oxide (4) per 1 mol of Zerewitinoff-active hydrogen atoms of the starter compound (1) is added to form a compound (ii);
   (iii) reacting the compound (ii) formed in step (ii) by addition of the dicarboxylic anhydride (2) to form a compound (iii); and
   (iv) reacting the compound (iii) from step (iii) with a portion (v2) of the alkylene oxide (4), wherein at least 1.15 mol of alkylene oxide (4) per 1 mol of the dicarboxylic anhydride (2) is added.

2. The process as claimed in claim 1, wherein the sum of the portion (v1) of the alkylene oxide (4) added in step (ii) and the portion (v2) of the alkylene oxide (4) added in step (iv) is at least 90 mol % of the total amount (vT) of the alkylene oxide (4) added.

3. The process as claimed in claim 1, wherein the basic catalyst (5) is added in step (i) and/or in step (iii) and/or in step (iv).

4. The process as claimed in claim 1, wherein the basic catalyst (5) comprises an amine.

5. The process as claimed in claim 4, wherein the amine comprises an aromatic amine.

6. The process as claimed in claim 1, wherein the alkylene oxide (4) comprises propylene oxide and/or ethylene oxide.

7. The process as claimed in claim 1, wherein the fatty acid ester (3) is employed in an amount of 10% by weight to 70% by weight, based on the sum of all components.

8. The process as claimed in claim 1, wherein the fatty acid ester (3) has no free hydroxyl groups in the fatty acid residues.

9. The process as claimed in 8, wherein the fatty acid ester (3) comprises cottonseed oil, peanut oil, coconut oil, linseed oil, palm kernel oil, olive oil, corn oil, palm oil, jatropha oil, rapeseed oil, soybean oil, sunflower oil, herring oil, sardine oil, tallow, or a mixture thereof.

10. The process as claimed in claim 1, wherein the cyclic dicarboxylic anhydride (2) comprises an aromatic cyclic dicarboxylic anhydride.

11. The process as claimed in claim 1, wherein a mixing power input introduced is between 0.8 and 5 W/l, based on the liquid volume after termination of step (iv).

12. The process as claimed in claim 1, wherein the polyoxyalkylene polyester polyol has an OH number of 100 to 300 mg KOH/g, determined according to the specification of DIN 53240.

13. The process as claimed in claim 1, wherein the polyoxyalkylene polyester polyol has a Gardner color number of 2.0 to 8.0, determined according to ASTM D 4890-88 in which the sample is dissolved in dimethyl sulfoxide in a weight ratio of 1:2.

14. The process as claimed in claim 1, further comprising reacting the polyoxyalkylene polyester polyol with a polyisocyanate to prepare a polyurethane.

15. The process as claimed in claim 2, wherein the sum of the portion (v1) of the alkylene oxide (4) added in step (ii) and the portion (v2) of the alkylene oxide (4) added in step (iv) is 100% of the total amount (vT) of the alkylene oxide (4) added.

16. The process as claimed in claim 3, wherein the basic catalyst (5) is added in step (i).

17. The process as claimed in claim 5, wherein the aromatic amine comprises imidazole, 1-methylimidazole, 2-methylimidazole, 4(5)-methylimidazole, 2,4(5)-dimethylimidazole, 1-ethylimidazole, 2-ethylimidazole, 1-phenylimidazole, 2-phenylimidazole, 4(5)-phenylimidazole, N,N-dimethylaminopyridine, or a mixture thereof.

18. The process as claimed in claim 7, wherein the fatty acid ester (3) is employed in an amount of 10% by weight to 40% by weight, based on the sum of all components.

19. The process as claimed in claim 18, wherein the fatty acid ester (3) is employed in an amount of 10% by weight to 30% by weight, based on the sum of all components.

* * * * *